United States Patent
Saha et al.

(10) Patent No.: US 11,734,036 B2
(45) Date of Patent: Aug. 22, 2023

(54) SYSTEM AND METHOD TO MONITOR AND MANAGE A PASSTHROUGH DEVICE

(71) Applicant: DELL PRODUCTS, LP, Round Rock, TX (US)

(72) Inventors: Rajib Saha, Bangalore (IN); Krishnaprasad Koladi, Bengaluru (IN); Santosh Gore, Bangalore (IN)

(73) Assignee: Dell Products L.P., Round Rock, TX (US)

(*) Notice: Subject to any disclaimer, the term of this patent is extended or adjusted under 35 U.S.C. 154(b) by 111 days.

(21) Appl. No.: 17/190,719

(22) Filed: Mar. 3, 2021

(65) Prior Publication Data
US 2022/0283834 A1 Sep. 8, 2022

(51) Int. Cl.
*G06F 9/455* (2018.01)
*G06F 9/54* (2006.01)

(52) U.S. Cl.
CPC ...... *G06F 9/45545* (2013.01); *G06F 9/45558* (2013.01); *G06F 9/54* (2013.01); *G06F 2009/45579* (2013.01)

(58) Field of Classification Search
CPC .... G06F 9/45545; G06F 9/45558; G06F 9/54; G06F 2009/45579
See application file for complete search history.

(56) References Cited

U.S. PATENT DOCUMENTS

| | | | |
|---|---|---|---|
| 6,654,830 B1 | 11/2003 | Taylor et al. | |
| 2008/0294808 A1* | 11/2008 | Mahalingam | G06F 13/24 710/26 |
| 2013/0173804 A1 | 7/2013 | Murthy et al. | |
| 2015/0331473 A1 | 11/2015 | Jreji et al. | |
| 2016/0259661 A1* | 9/2016 | Tasoulas | G06F 9/5083 |
| 2017/0223153 A1* | 8/2017 | Johnsen | H04L 49/25 |
| 2019/0042741 A1* | 2/2019 | Abodunrin | G06F 13/4068 |
| 2019/0379594 A1* | 12/2019 | Johnsen | H04L 49/201 |
| 2020/0167247 A1* | 5/2020 | Tsirkin | G06F 11/1484 |
| 2021/0152494 A1* | 5/2021 | Johnsen | H04L 47/828 |
| 2021/0208920 A1* | 7/2021 | Rugina | G06F 13/4282 |
| 2022/0214968 A1* | 7/2022 | Warkentin | G06F 13/1668 |

OTHER PUBLICATIONS

Andrew J. Younge, Evaluating GPU Passthrough in Xen for High Performance Cloud Computing, 2014, IEEE (Year: 2014).*

* cited by examiner

*Primary Examiner* — Dong U Kim

(74) *Attorney, Agent, or Firm* — Larson Newman, LLP

(57) ABSTRACT

An information handling system includes a service module that may detect an action performed on a passthrough device, invoke an application programming interface on a hypervisor, receive a response to the action on the passthrough device from the hypervisor, and push management information to a management controller. The hypervisor may detect the passthrough device, proxy an operating system call associated with the action to a guest operating system of the virtual machine over the application programming interface, and transmit the response received from the guest operating system to the service module. The guest operating system may echo the operating system call on a virtual machine, and proxy the response to the operating system call to the hypervisor.

20 Claims, 6 Drawing Sheets

SYSTEM AND METHOD TO MONITOR AND MANAGE A PASSTHROUGH DEVICE

FIELD OF THE DISCLOSURE

The present disclosure generally relates to information handling systems, and more particularly relates to monitoring and managing a passthrough device.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a service module that may detect an action performed on a passthrough device, invoke an application programming interface on a hypervisor, receive a response to the action on the passthrough device from the hypervisor, and push management information to a management controller. The hypervisor may detect the passthrough device, proxy an operating system call associated with the action to a guest operating system of the virtual machine over the application programming interface, and transmit the response received from the guest operating system to the service module. The guest operating system may echo the operating system call on a virtual machine, and proxy the response to the operating system call to the hypervisor.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
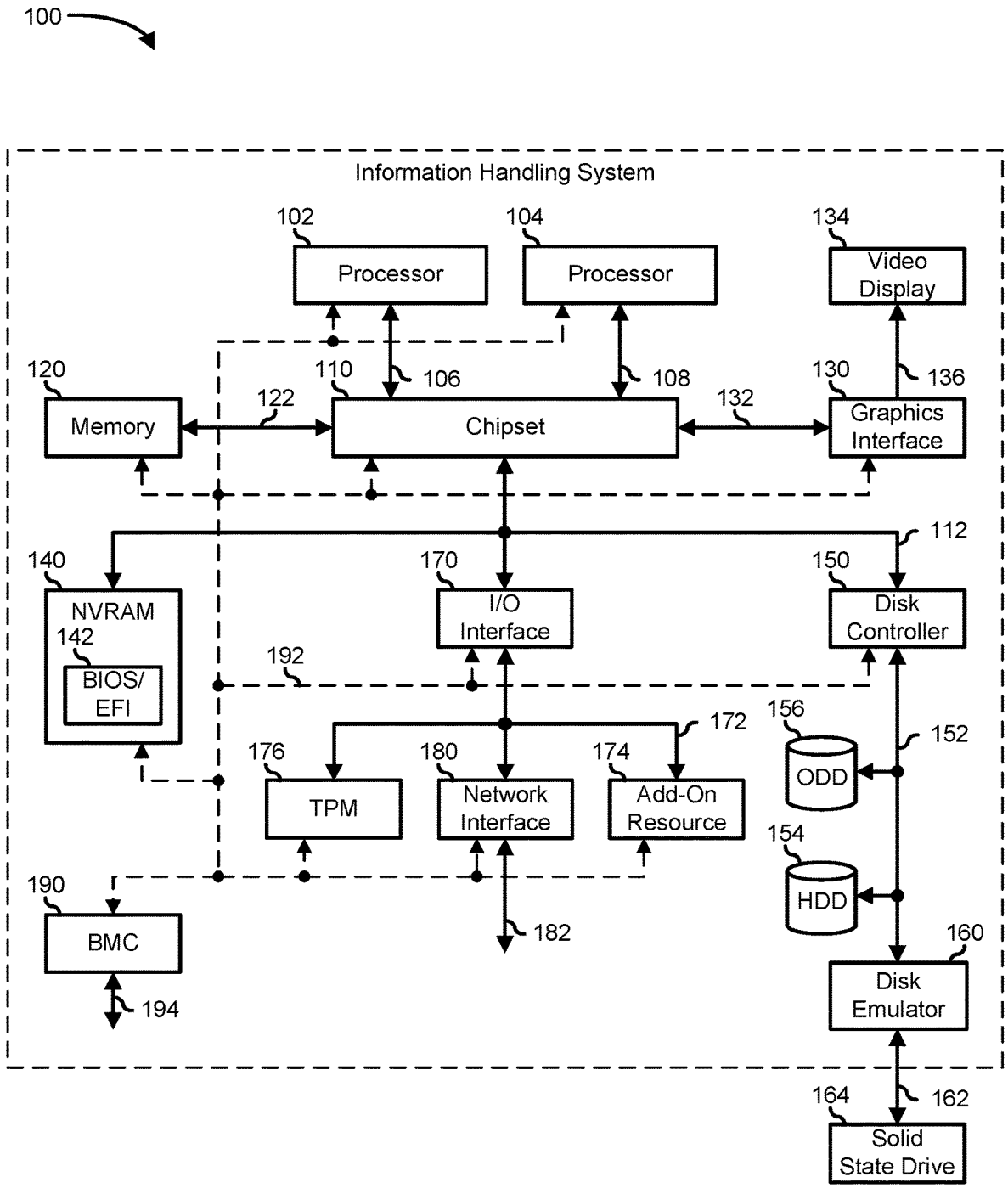
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

In a virtualized environment, a physical device may be configured as a passthrough device of a virtual machine. This allows the device to be used more efficiently. Operating system and/or platform-specific methods exist to monitor and manage passthrough devices in a virtual cloud environment. However, there is no definite standard to manage passthrough devices, such as via an in-band and/or out-of-band management similar to the management of PCIe devices exposed to hypervisors.

Devices that are not in the standard device list (SDL) of an information handling system manufacturer are typically not monitored and/or managed via a management controller of the information handling system. Instead, these non-SDL devices are typically monitored and/or managed via an operating system agent. However, if a non-SDL device is configured as a passthrough device to the virtual machine, then the physical functions of the passthrough device are not accessible to the hypervisor. Because of this, the passthrough device cannot be monitored or managed from the hypervisor. To address the above and other concerns, the present disclosure proposes a system and method to monitor and manage one or more devices configured as a passthrough device.

Figure 2:
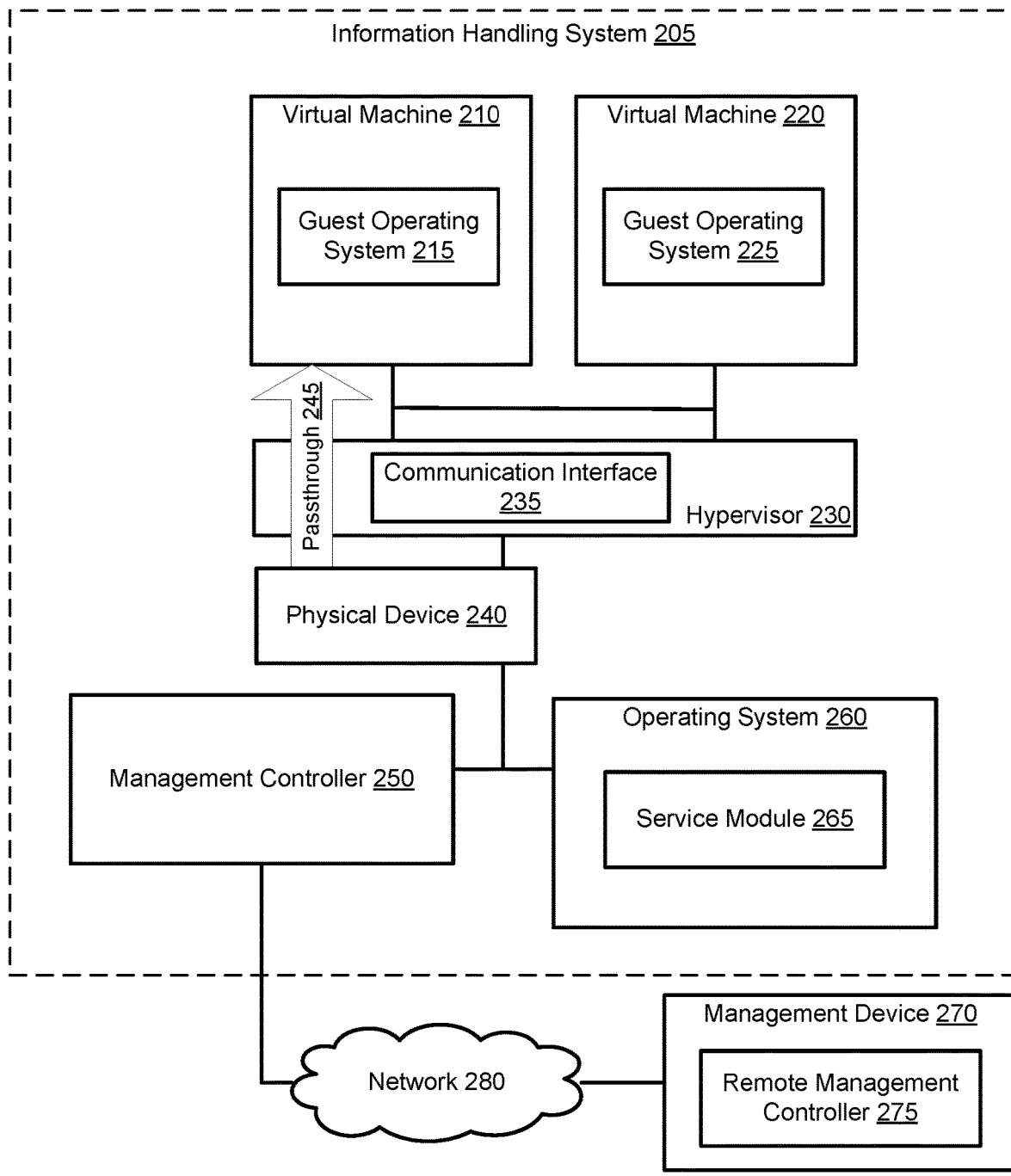
FIG. 2 is a block diagram illustrating a platform and operating system agnostic framework to monitor and manage a passthrough device, according to an embodiment of the present disclosure.

FIG. 2 shows a block diagram of a device management system 200 of platform and operating system agnostic framework to monitor and manage one or more passthrough devices. Device management system 200 includes an information handling system 205, a network 280, and a management device 270. Information handling system 205, which is similar to information handling system 100 of FIG. 1, includes a virtual machine 210, a virtual machine 220, a hypervisor 230, a device 240, a management controller 250, and an operating system 260. Virtual machine 210 includes a guest operating system 215. Virtual machine 220 includes a guest operating system 225. Hypervisor 230 includes a communication interface 235. Operating system 260 includes a service module 265. The components of device management system 200 may be implemented in hardware, software, firmware, or any combination thereof.

Information handling system 205 includes a virtualization software layer, such as a hypervisor 230. Hypervisor 230 may include software and/or firmware generally operable to allow multiple operating systems to run on a single information handling system at the same time. This operability is generally allowed via virtualization, a technique for hiding the physical characteristics of information handling system resources from how other systems, applications, or end-users interact with those resources. For example, hypervisor 230 provides an environment in which one or more virtual machines, such as virtual machine 210 and virtual machine 220 may be hosted. Hypervisor 230 may be one of a variety of proprietary and/or commercially available virtualization platforms such as VMWARE® Server, Microsoft® Hyper-V, Oracle® VM, etc.

Each of the virtual machines may include a guest operating system, also referred to as a virtual machine kernel, along with any applications or other software running on the guest operating system. Each guest operating system may be any operating system compatible with and/or supported by hypervisor 230. In addition, each guest operating system may be a separate instance of the same operating system or an instance of different operating systems. For example, in one embodiment, guest operating system 215 and guest operating system 225 may be a Linux® operating system. As another example, guest operating system 215 may be a Linux operating system and guest operating system 225 may be VxWorks® operating system. Also, guest operating system 215 and 225 are communication or application programming interface aware, such they are configured to transmit and/or receive information and/or commands via communication interface 235. Although information handling system 205 is depicted as having two virtual machines, any number of virtual machines may be running on information handling system 205 at any given time.

Device 240 may be a USB, SCSI, PCIe device, or something similar. For example, device 240 includes a NIC, graphics card, storage device, a hardware accelerator, etc. Device 240 may be a device that is not included in the SDL of supported devices by a manufacturer of information handling system 205, such as a third-party device installed by a user. Devices that are in the SDL list may have been tested by the manufacturer and are supported, such as these devices can be monitored and/or managed via management controller 250 and/or remote management controller 275. In contrast, non-SDL devices may not be monitored and/or managed via management controller 250 and/or remote management controller 275.

Passthrough 245 allows devices to appear and behave as if they were physically attached to the guest operating system. This removes the latency of the virtual machine to physical device communication which improves the performance of the virtual machine. In the example of FIG. 1, device 240 is passed through to virtual machine 210 using passthrough 245 and thus is considered a passthrough device of virtual machine 210. This means that virtual machine 220 can directly access device 240 without the involvement of hypervisor 230. Although information handling system 205 is depicted as having one physical device configured as a passthrough device, any number of physical devices may be configured as passthrough devices on information handling system 205 at any given time.

Communication interface 235 may be used to pass a message and/or command between service module 265, device 240, and/or a virtual machine and its operating system. Communication interface 235 may be a shared memory type of communication provided between virtual machines by hypervisor 230 and accordingly accessible through a message passing or other type of interface provided by the hypervisor to service module 265 and/or device 240. Hypervisor 230 may assign a virtual machine transport address to each virtual machine, to be used as the basis for communication between virtual machines, service module 265, device 240, etc. Communication interface 235 may be configured to provide an application programming interface for monitoring and managing device 240. Examples of communication interface 235 include VMware® Virtual Machine Communication Interface (VMCI) and VMware local virtual networking. Communication interface 235 may be an interface that virtual machines use to communicate with other virtual machines and the host system, such as information handling system 205.

Management controller 250 may be configured to provide an out-of-band management platform via, for example, a separate expansion card, or via functionality integrated into the main service board. Management controller 250 may be provided by a BMC, similar to BMC 190, and/or other components with similar functionality to that described below while remaining within the scope of the present disclosure. In one embodiment, the functionality of management controller 250 may be provided by an iDRAC.

Service module 265 is an operating system agent that is included in operating system 260. Service module 265 may be configured to provide a lightweight software service that integrates operating system features with the management controller 250 and include various functionalities such as providing operating system information to management controller 250 and adding capabilities such as lifecycle log event replication into the operating system log. Windows® management instrumentation (WMI) support, simple network management protocol (SNMP) alerts via the operating system, hard reset and remote full power cycle capabilities, automated report collection processes, and other functionality, while producing a relatively little impact on the processing system and a relatively small footprint in the memory system. In one embodiment, the functionality of service module 265 may be provided by an iDRAC service module (iSM). Service module 265 may be provided in operating system 260 during an initial boot of information handling system 205 or may be factory installed in information handling system 205 by a server device provider.

Management device 270 may include a remote management controller 275 which is similar to management controller 250. Management device 270 is in communication with information handling system 205 via network 280. Management device 270 may be an information handling system, computer, server, or management console that enables a user or operator to receive operational conditions and manage functions of information handling system 205 via network 280. For example, management device 270 may be used to monitor and manage the passthrough device using a remote management controller 275, which is similar to management controller 250.

Network 280 may be implemented as or maybe a part of, a storage area network (SAN), a personal area network (PAN), a local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data and/or messages. Network 280 may transmit data using any storage and/or communication protocol, including without limitation, Fibre Channel, Frame Relay, Asynchronous Transfer Mode (ATM), Internet Protocol (IP), other packet-based protocol, SCSI, Internet SCSI (iSCSI), Serial Attached SCSI (SAS), or any other transport that operates with the SCSI protocol, ATA, SATA, advanced technology attachment packet interface (ATAPI), serial storage architecture (SSA), IDE and/or any combination thereof. Network 280 and its various components may be implemented using hardware, software, or any combination thereof.

Figure 3:
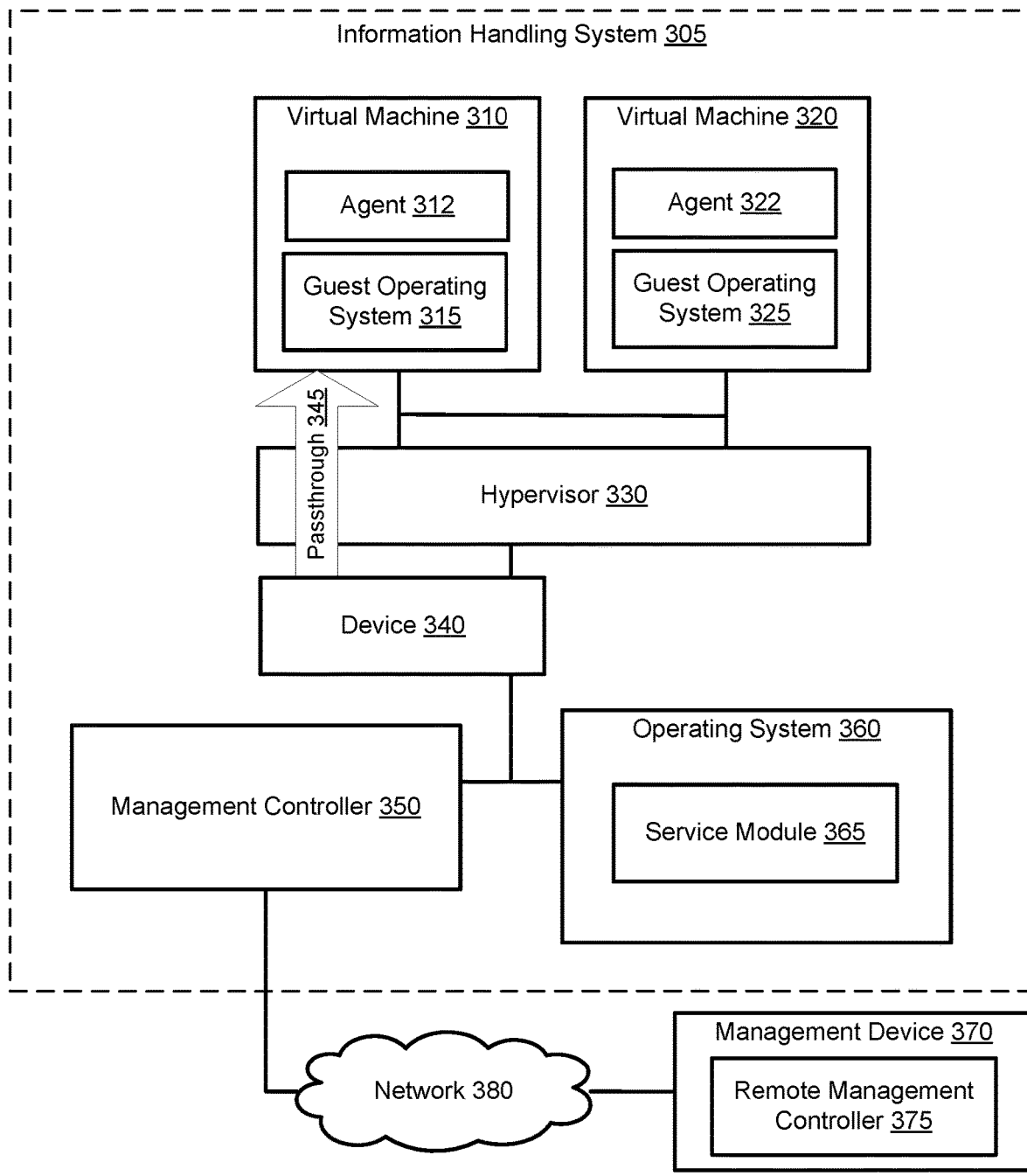
FIG. 3 is a block diagram illustrating a platform and operating system agnostic framework to monitor and manage a passthrough device, according to an embodiment of the present disclosure.

FIG. 3 shows a block diagram of an example device management system 300 of platform and operating system agnostic framework to monitor and manage one or more passthrough devices. Device management system 300, which is similar to device management system 200 of FIG. 2, includes an information handling system 305, a network 380, and a management device 370. Information handling system 305, which is similar to information handling system 205 of FIG. 2, includes a virtual machine 310, a virtual machine 320, a hypervisor 330, a device 340, a management controller 350, and an operating system 360. Virtual machine 310 includes an agent 312 and a guest operating system 315. Virtual machine 320 includes an agent 322 and a guest operating system 315. Operating system 360 includes a service module 365. The components of device management system 300 may be implemented in hardware, software, firmware, or any combination thereof.

The various components of device management system 300 are similar to device management system 200 of FIG. 2. For example, network 380 is similar to network 280 while management device 370 and remote management controller 375 are similar to management device 270 and remote management controller 275 if FIG. 2 respectively. Operating system 360 and service module 365 are similar to operating system 260 and service module 265 while management controller 350 is similar to management controller 250 of FIG. 2. Hypervisor 330 is similar to hypervisor 230 of FIG. 2. However, hypervisor 330 may not include a communication interface similar to communication interface 235 of FIG. 2. Accordingly, virtual machine 310 and virtual machine 320 is similar to virtual machine 210 and virtual machine 220 of FIG. 2.

Agent 312 and agent 322 may be any system, device, or apparatus operable to monitor and/or manage one or more devices configured as passthrough devices, as described in greater detail below. In particular, agent 312 and agent 322 may be a non-SDL plugin on a guest operating system for a passthrough device. For example, agent 312 may be used in monitoring and/or managing device 340. Device 340 is similar to device 240 which is configured as a passthrough device to virtual machine 310 via passthrough 345. Agent 114 may be implemented using hardware, software, or any combination thereof.

Figure 4:
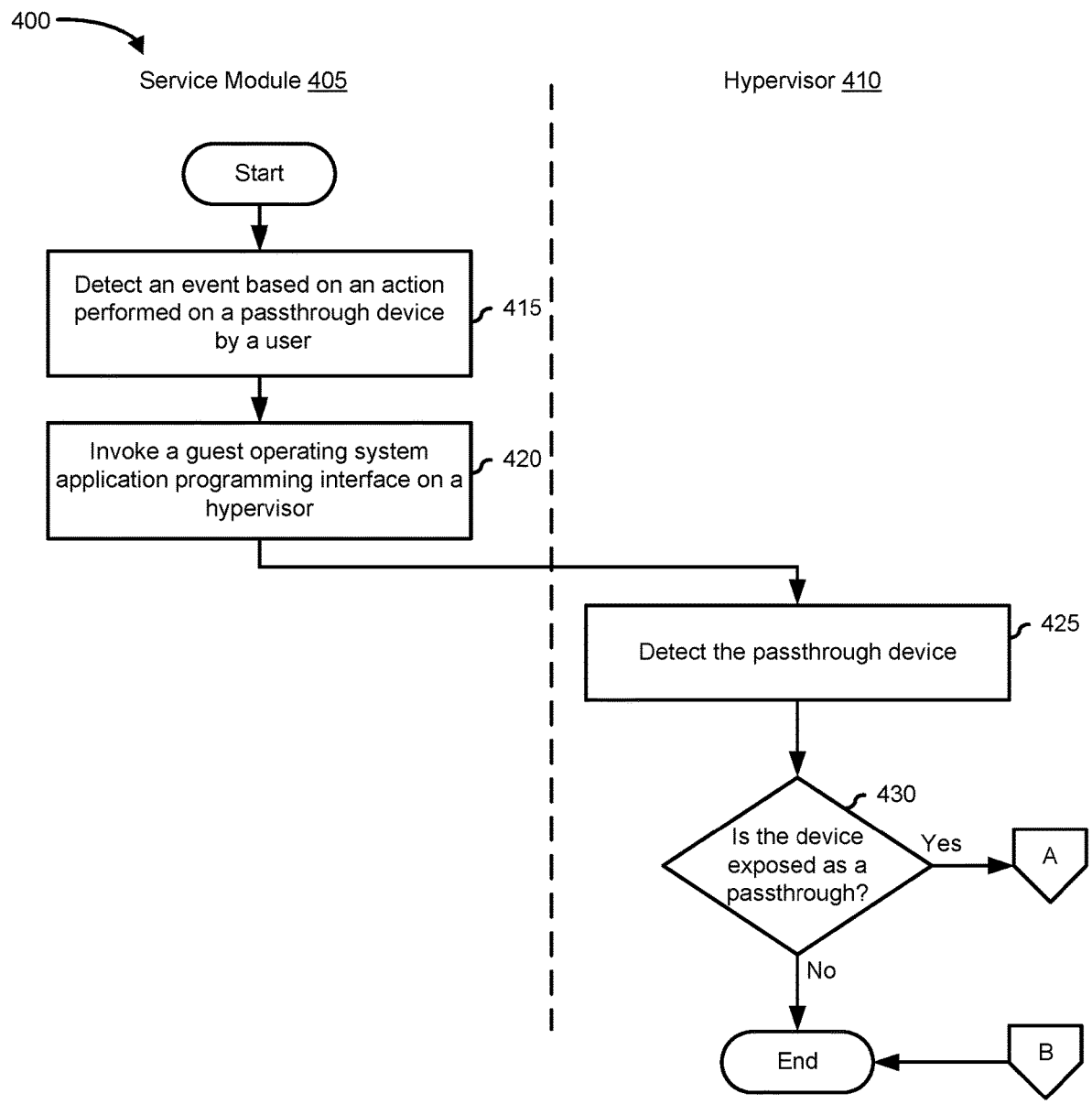
FIGS. 4 and 5 are flowcharts illustrating a method for monitoring and managing a passthrough device, according to an embodiment of the present disclosure.

FIG. 4 illustrates a method 400 for platform and operating system agnostic framework to monitor and manage a passthrough device using a communication interface. Method 400 may be performed by one or more components of FIG. 2, such as management controller 250, service module 265, hypervisor 230, communication interface 235, guest operating system 215, etc. While embodiments of the present disclosure are described in terms of device management system 200 of FIG. 2, it should be recognized that other systems may be utilized to perform the described method. One of skill in the art will appreciate that this flowchart explains a typical example, which can be extended to advanced applications or services in practice.

In this example, a service module 405 performs block 415 and block 420 while hypervisor 410 performs block 425 and decision block 430. Method 400 typically starts at block 415 where the method detects an event based on an action performed on a passthrough device by an administrator via a management controller. For example, the device administrator performs a safe removal of non-volatile memory express (NVMe) from a hypervisor. The method proceeds to block 420. At block 420, the method invokes a guest operating system call on the hypervisor based on the detected event. The system call may include information such as an identifier of the passthrough device. The system call may be performed via a communication or an application programming interface at the hypervisor. The method proceeds to block 425.

At block 425, the method detects the corresponding device that is exposed to a virtual machine over passthrough. The method determines various information regarding the device such as its capabilities. The method proceeds to decision block 430 where the method determines whether the device is exposed as a passthrough device to a virtual machine. If the method detects that the device is exposed as a passthrough device to a virtual machine, then the "YES" branch is taken and the method proceeds to block 505 of FIG. 5. If the method detects that the device is not exposed as a passthrough device to a virtual machine, then the "NO" branch is taken and the method ends.

Figure 5:
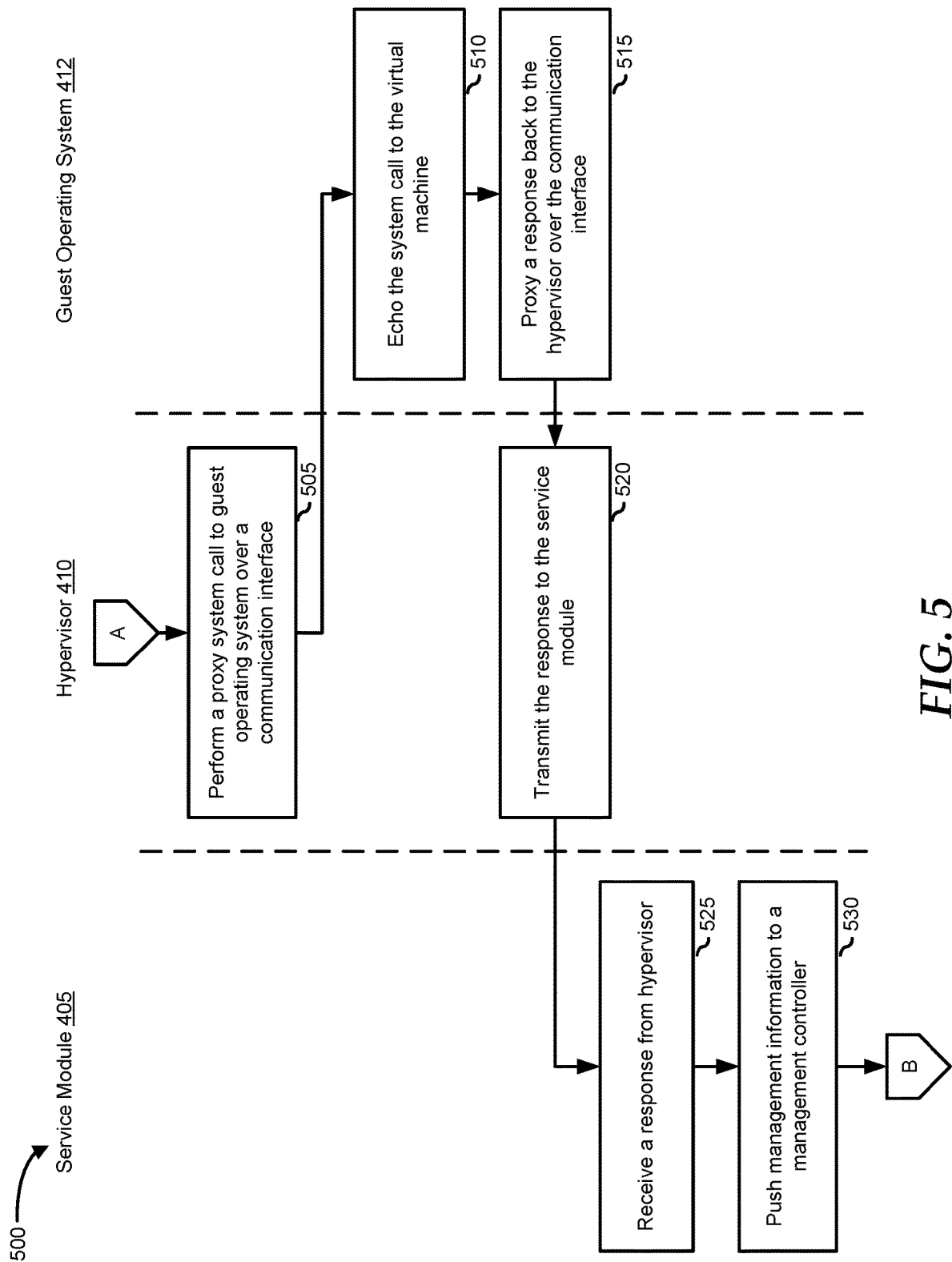

FIG. 5 illustrates a method 500 which is a continuation of method 400 of FIG. 4. In this example, service module 405 performs block 525 and block 530 while hypervisor 410 performs block 505 and block 520. In addition, a guest operating 412 performs block 510 and block 515. Method 500 typically starts at block 505, where the method performs a proxy of the operating system call, or simply referred to as a system call, to the guest operating system over a communication interface. The system call may have resulted from an action performed on a physical device configured as a passthrough device of a virtual machine. Hypervisor 410 may relay the system call to a guest operating system via a communication interface. Hypervisor 410 may be configured to capture, monitor, and/or listen for such system calls from the service module. The method proceeds to block 510 where a communication interface aware guest operating system echoes the system call received to the virtual machine. The method proceeds to block 515.

At block 515, the guest operating system proxies a response to the system call back to the hypervisor over the communication. The response may include a status of the system call such as "completed." The method proceeds to block 520 where the hypervisor transmits the response to the service module. The hypervisor may also include an identifier of the virtual machine associated with the passthrough device. The method proceeds to block 525 where the service module receives the response to the system call from the hypervisor. The method proceeds to block 530, where the service module may push data associated with the response such as management information to the operating system call to the management controller. The management information may also include information associated with the passthrough device, such as a passthrough device identifier. Subsequently, the method ends.

Figure 6:
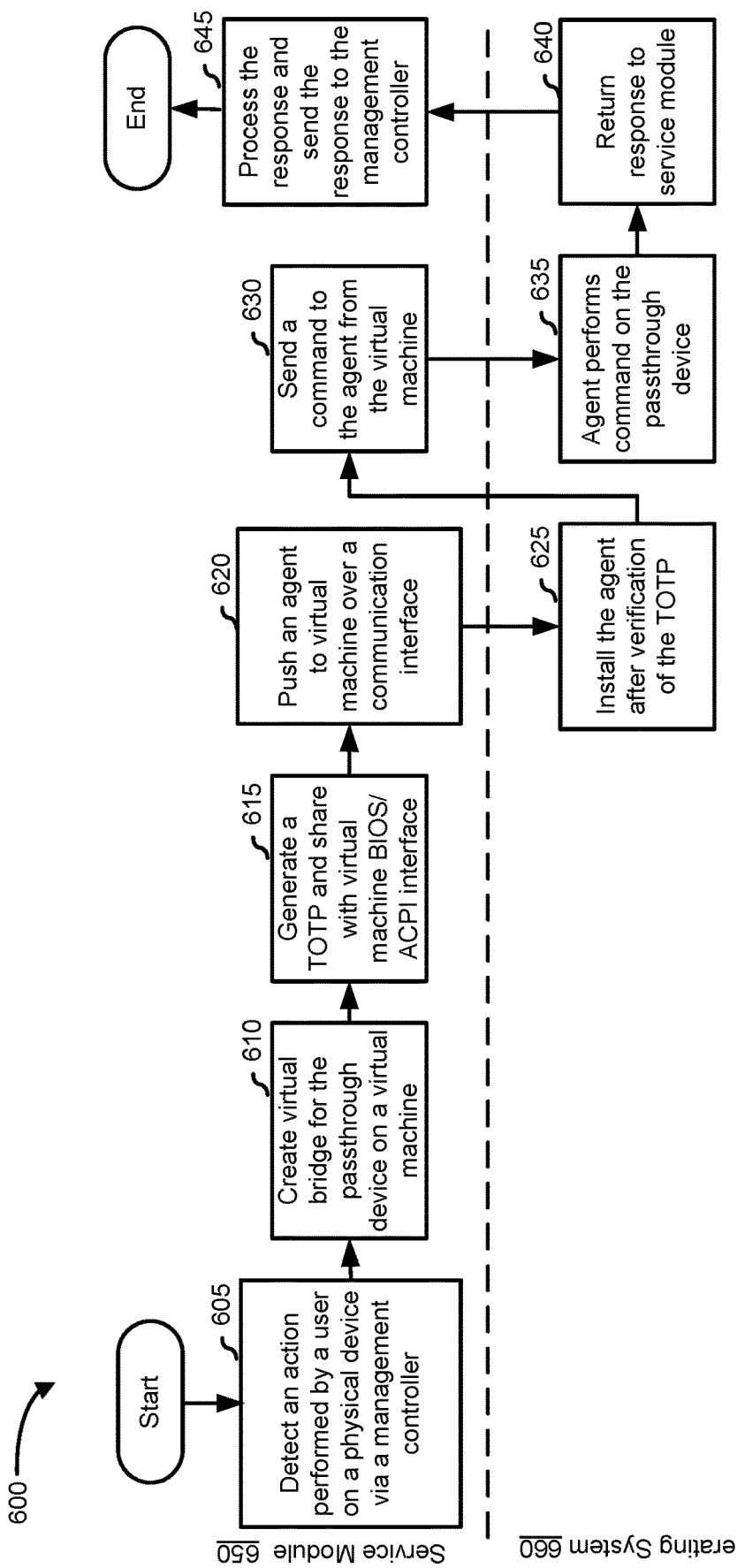
FIG. 6 is a flowchart illustrating an example of a method for platform and operating system agnostic framework to monitor and manage a passthrough device, according to an embodiment of the present disclosure.

FIG. 6 shows a flowchart of a method 600 for platform and operating system agnostic framework to monitor and manage a passthrough device using a guest operating system agent. For example, method 600 may run and/or install a non-SDL plugin on the guest operating system to monitor and/or manage the passthrough device(s). Method 600 may be performed by one or more components of device management system 300 of FIG. 3, such as service module 365, guest operating system 315, and/or agent 312. While embodiments of the present disclosure are described in terms of device management system 300 of FIG. 3, it should be recognized that other systems may be utilized to perform the described method. One of skill in the art will appreciate that this flowchart explains a typical example, which can be extended to advanced applications or services in practice.

Service module 650 may be configured to perform block 605, block 610, block 615, block 620, block 630, and block 645. Guest operating system 660 may be configured to perform block 625, block 635, and block 640. Method 600 typically starts at block 605, where the method detects an event based on an action by a user performed on a device configured as a passthrough device to a virtual machine. The action may be performed via a management controller or a remote management controller. For example, the user may safely remove an NVMe device on a hypervisor. The NVMe may have been configured as a passthrough device to a virtual machine. The event may include information associated with the passthrough device such as its identifier, media access control (MAC) address, and capabilities.

The method proceeds to block 610 where the method creates a virtual bridge for the passthrough device on a virtual machine. The virtual bridge connects the passthrough device to the virtual machine. The method may proceed to block 615, where the method creates a time-based one-time password (TOTP) and share the TOTP with the virtual machine BIOS and/or the advanced configuration and power interface (ACPI). The TOTP may be used to authenticate for access to the virtual machine that honors the TOTP after verification. The TOTP may be used for authentication between the hypervisor and the agent in the guest operating system. The method proceeds to block 620 where the method pushes an agent to the virtual machine where the passthrough device is assigned. The agent may be pushed to the virtual machine over the communication interface. The method proceeds to block 625.

At block 625, the method may install the agent after verification of the TOTP. After the agent is installed, the service module may push a device command associated with the action performed by the user on the passthrough device over the communication interface. The method proceeds to block 630 where the method sends a device command or simply command to the agent in the virtual machine via the communication interface. The method proceeds to block 635, where the agent performs the command on the passthrough device. After performing the command, the method proceeds to block 640, where the method returns a response to service module 650. The response may be from the passthrough device, which may include the status of the command. The method proceeds to block 645 where the method processes the response and sends the processed response to the management controller. The processed response may include information associated with the passthrough device. For example, the information may include a virtual machine identifier and/or passthrough device identifier in addition to the status.

Although FIG. 4, FIG. 5, and FIG. 6 show example blocks of method 400, method 500, and method 600 in some implementation, method 400, method 500, and method 600 may include additional blocks, fewer blocks, different blocks, or differently arranged blocks than those depicted in FIG. 4, FIG. 5, and FIG. 6. Additionally, or alternatively, two or more of the blocks of method 400, method 500, and method 600 may be performed in parallel. For example, block 610 and block 615 of method 600 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   detecting, by a processor, an action performed on a physical device by a management controller, wherein the physical device is not in a standard device list of devices monitored and managed by the management controller;

in response to determining that the physical device is configured as a passthrough device, invoking an operating system call on a hypervisor based on the action;

relaying the operating system call, by the hypervisor, to a guest operating system:

receiving a response to the operating system call that was proxied back to the hypervisor by the guest operating system, wherein the response includes management information associated with the action; and transmitting the management information to the management controller.

2. The method of claim 1, wherein the response was based on the operating system call that was echoed by the guest operating system.

3. The method of claim 1, wherein the action was performed by a user via the management controller.

4. The method of claim 1, wherein the hypervisor proxies the operating system call to the guest operating system over an application programming interface.

5. The method of claim 4, wherein the guest operating system is aware of the application programming interface.

6. The method of claim 1, wherein the response includes a status of the action.

7. The method of claim 1, wherein the hypervisor determined whether the physical device is configured as the passthrough device.

8. The method of claim 1, wherein the passthrough device is a peripheral component interconnect express device.

9. An information handling system, comprising:
a processor; and
a memory device storing code that when executed causes the processor to perform operations, the operations including: detecting an action performed on a physical device by a management controller, wherein the physical device is not in a standard device list of devices monitored and managed by the management controller;

in response to determining that the physical device is configured as a passthrough device, invoking an operating system call on a hypervisor based on the action performed on the physical device;

relaying the operating system call, by the hypervisor, to a guest operating system;

receiving a response to the operating system call that was proxied back to the hypervisor by the guest operating system, wherein the response includes management information associated with the action; and pushing the management information to the management controller.

10. The information handling system of claim 9, wherein the passthrough device is a peripheral component interconnect express device.

11. The information handling system of claim 9, wherein the guest operating system is aware of an application programming interface associated with the operating system call.

12. The information handling system of claim 9, wherein the action was performed by a user via the management controller.

13. The information handling system of claim 9, the operations further comprise determining whether the physical device is configured as the passthrough device.

14. A non-transitory computer-readable medium storing instructions that are executable to perform operations comprising:

detecting an action performed on a physical device by a management controller, wherein the physical device is not in a standard device list of devices monitored and managed by the management controller:

in response to determining that the physical device is configured as a passthrough device, invoking an operating system call on a hypervisor based on the action;

relaying the operating system call, by the hypervisor, to a guest operating system;

receiving a response to the operating system call that was proxied back to the hypervisor by the guest operating system, wherein the response includes management information associated with the action; and transmitting the management information to the management controller.

15. The non-transitory computer-readable medium of claim 14, wherein the response was based on the operating system call that was echoed by the guest operating system.

16. The non-transitory computer-readable medium of claim 14, wherein the action was performed by a user via the management controller.

17. The non-transitory computer-readable medium of claim 14, wherein the guest operating system is aware of an application programming interface associated with the operating system call.

18. The non-transitory computer-readable medium of claim 14, wherein the response includes a status of the action.

19. The non-transitory computer-readable medium of claim 14, wherein the hypervisor determined whether the physical device is configured as the passthrough device.

20. The non-transitory computer-readable medium of claim 14, the operations further comprise determining whether the physical device is configured as the passthrough device.

* * * * *